United States Patent
Kahn (10) Patent No.: US 10,097,894 B2
(45) Date of Patent: Oct. 9, 2018

(54) ELECTRONIC PROGRAM GUIDE WITH DYNAMIC ORDERING OF ASSETS

(71) Applicant: ARRIS Enterprises LLC, Suwanee, GA (US)

(72) Inventor: Michael R. Kahn, Cherry Hill, NJ (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/366,067

(22) Filed: Dec. 1, 2016

(65) Prior Publication Data

US 2018/0160185 A1 Jun. 7, 2018

(51) Int. Cl.
*H04N 21/482* (2011.01)
*H04N 21/6405* (2011.01)

(52) U.S. Cl.
CPC ....... *H04N 21/482* (2013.01); *H04N 21/6405* (2013.01)

(58) Field of Classification Search
None
See application file for complete search history.

(56) References Cited

U.S. PATENT DOCUMENTS

| 8,707,357 | B1* | 4/2014 | Sie | G06Q 20/40 725/38 |
| 2007/0192791 | A1* | 8/2007 | Sullivan | H04N 5/50 725/38 |
| 2009/0177989 | A1* | 7/2009 | Ma | G06F 3/0482 715/766 |
| 2010/0199219 | A1* | 8/2010 | Poniatowski | G06F 3/0482 715/825 |
| 2011/0119595 | A1* | 5/2011 | Bydeley | H04N 21/44213 715/738 |
| 2012/0093476 | A1* | 4/2012 | Mountain | H04N 21/4312 386/230 |
| 2014/0196063 | A1* | 7/2014 | Schorter | H04N 21/2543 725/5 |

* cited by examiner

*Primary Examiner* — Hoang Vu A Nguyen Ba
(74) *Attorney, Agent, or Firm* — Stewart M. Wiener (57) ABSTRACT

Various implementations described herein are directed to devices and methods for providing an electronic program guide as a user interface. The devices and methods may identify a list of assets in a resource distribution system that are available for viewing by subscribers, identify a subset of assets from the list of assets that are currently being viewed by the subscribers, and organize the list of assets such that the subset of assets is emphasized in the user interface, which is capable of communicating with the resource distribution system.

19 Claims, 5 Drawing Sheets

User Interface -- Electronic Program Guide

| Video Program Asset D | Price $5 |
| Video Program Asset A | Price $5 |
| Video Program Asset G | Price $5 |
| Video Program Asset F | Price $5 |
| Video Program Asset B | Price $5 |
| Video Program Asset C | Price $5 |
| Video Program Asset E | Price $5 |

User Interface -- Electronic Program Guide

| Video Program Asset D | Price $5 |
| Video Program Asset A | Price $5 |
| Video Program Asset G | Price $5 |
| *Video Program Asset F | Price $5 |
| Video Program Asset B | Price $5 |
| Video Program Asset C | Price $5 |
| Video Program Asset E | Price $5 |

FIG. 2B

User Interface – Electronic Program Guide 200, 200C

| Video Program Asset D | Price $5 |
| Video Program Asset A | Price $4 |
| Video Program Asset G | Price $4 |
| *Video Program Asset F | Price $5 |
| Video Program Asset B | Price $5 |
| Video Program Asset C | Price $4 |
| Video Program Asset E | Price $4 |

FIG. 2C

User Interface – Electronic Program Guide 200, 200D

| Video Program Asset C | Price $4 |
| Video Program Asset A | Price $4 |
| Video Program Asset E | Price $4 |
| Video Program Asset G | Price $4 |
| *Video Program Asset F | Price $5 |
| Video Program Asset B | Price $5 |
| Video Program Asset D | Price $5 |

310 — identifying a list of assets in a resource distribution system that are available for viewing by subscribers 320 — identifying a subset of assets from the list of assets that are currently being viewed by the subscribers 330 — organizing the list of assets such that the subset of assets is emphasized in a user interface capable of communicating with the resource distribution system

ELECTRONIC PROGRAM GUIDE WITH DYNAMIC ORDERING OF ASSETS

BACKGROUND

This section is intended to provide information relevant to understanding various technologies described herein. As the section's title implies, this is a discussion of related art that should in no way imply that it is prior art. Generally, related art may or may not be considered prior art. It should therefore be understood that any statement in this section should be read in this light, and not as any admission of prior art.

Limited bandwidth digital video systems may include systems such as Switched Digital Video (SDV) systems and Over-The-Top (OTT) broadcast systems. SDV describes video services in cable networks that are a hybrid between VOD (Video-On-Demand) and traditional one-way broadcast services. OTT describes a system providing video services through digital communication protocols, such as TCP/IP and UDP, and OTT systems may also rely on multicasting of live video streams.

Sometimes, SDV services are not always streamed on any given portion of a video distribution network. Instead, SDV services are typically placed on the video distribution network only if one or more subscribers tunes to that service. These limited bandwidth systems can change the model for bandwidth consumption from a linear model based on the program offering to one based on program viewing statistics. In some cases, an SDV service does not consume any bandwidth until a subscriber tunes to that particular service. Further, SDV allows service providers to offer an extensive lineup of niche content ranging from local and premium sports packages to ethnic programming, thus leveraging a "long tail" phenomenon to improve customer satisfaction, reduce churn, and generate revenue streams from premium tiers. The bandwidth savings are achieved since some channels being offered are not being watched by anyone.

Nevertheless, there is a finite amount of bandwidth available for programs, and with more programs being offered than available bandwidth to carry all offered programs simultaneously, the possibility exists that a user may tune to a channel and there would not be sufficient network resources to allow the viewer to see it. This could lead to a poor user experience, because some programs listed in traditional television programming may not actually be available for viewing. Further, while these examples are described using SDV as the context for which the dynamic ordering is applied, these examples can also be applied to OTT type video distribution systems that use multicast, where the bandwidth can also be limited or finite, and thus bandwidth limitations are also present.

SUMMARY

Described herein are various implementations of method. The method may include identifying a list of assets in a resource distribution system that are available for viewing by subscribers. The method may include identifying a subset of assets from the list of assets that are currently being viewed by the subscribers. The method may include organizing the list of assets such that the subset of assets is emphasized in a user interface capable of communicating with the resource distribution system.

The method may include displaying the list of assets to the subscribers via the user interface, displaying the subset of assets to the subscribers via the user interface, and displaying the organized list of assets via the user interface such that the subset of assets is emphasized in the user interface. The resource distribution system may include a video distribution network relying on multicasting of real time video streams. Each asset in the list of assets may be a switched digital video (SDV) program session or an over-the-top (OTT) multicast program session that is started for each asset selected for viewing by the subscribers. The list of assets may include a number of total assets, and the number of total assets may include a number of available assets that is at least less than the number of total assets. The number of available assets may include a number of guaranteed assets that is being currently viewed, and the number of available assets may include a number of non-guaranteed assets that is not currently being viewed.

In some implementations, availability of an asset in the list of assets may be based on available bandwidth in the resource distribution system at a time of requesting access to the asset by the subscribers. Each asset in the emphasized subset of assets may be a guaranteed asset for selection of viewing by the subscribers. Each asset not in the emphasized subset of assets may be a non-guaranteed asset for selection of viewing by the subscribers. Each asset in the emphasized subset of assets is being viewed by at least one subscriber. The emphasized subset of assets may be moved to a top of the list of assets to encourage selection by the subscribers. The emphasized subset of assets may be sequentially ordered from top to bottom based on a number of subscribers that are currently viewing each asset to encourage selection by the subscribers. Each asset in the list of assets may have a purchase price, and each asset in the emphasized subset of assets may have a reduced purchase price to encourage selection by the subscribers.

Described herein are various implementations of a device. The device may include a processor and memory having stored thereon instructions that, when executed by the processor, cause the processor to identify a list of assets in a resource distribution system that are available for viewing by subscribers, identify a subset of assets from the list of assets that are currently being viewed by the subscribers, and organize the list of assets such that the subset of assets is emphasized in a user interface capable of communicating with the resource distribution system.

In some implementations, the device may include a digital video device, and the user interface may include an electronic program guide capable of interfacing with each of the subscribers via a display of the digital video device. The electronic program guide may display the list of assets to the subscribers, display the subset of assets to the subscribers, and display the organized list of assets to the subscribers. The list of assets may provide a number of total assets with a number of available assets that is at least less than the number of total assets. The number of available assets may include a number of guaranteed assets that is being currently viewed. The number of available assets may include a number of non-guaranteed assets that is not currently being viewed.

Described herein are various implementations of a non-transitory computer-readable medium having stored thereon a plurality of computer-executable instructions which, when executed by a computer, cause the computer to communicate with a resource distribution device that receives and distributes multiple video program assets from multiple different sources to subscribers, identify a list of multiple video program assets from the resource distribution device that are available for viewing by the subscribers, identify a subset of multiple video program assets from the list of multiple video program assets that are currently being viewed by the subscribers, and organize the list of multiple video program assets such that the subset of multiple video program assets is emphasized in an electronic program guide that interfaces with the subscribers via interaction with a display device.

In some implementations, the resource distribution device may include a limited bandwidth digital video distribution device, and availability of an asset in the list of multiple video program assets may be based on available bandwidth determined by the resource distribution device at a time of requesting access to the asset by the subscribers. The list of multiple video program assets may provide a number of total assets with a number of available assets that is at least less than the number of total assets. The number of available assets may include a number of guaranteed assets that is being currently viewed. The number of available assets may include a number of non-guaranteed assets that is not currently being viewed.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Moreover, the claimed subject matter is not limited to implementations that solve any or all disadvantages noted in any part of this disclosure.

BRIEF DESCRIPTION OF THE DRAWINGS

Implementations of various techniques are described herein with reference to the accompanying drawings. It should be understood, however, that the accompanying drawings illustrate only various implementations described herein and are not meant to limit embodiments of various techniques described herein.

DETAILED DESCRIPTION

Various implementations described herein refer to and are directed to providing an electronic program guide. In some implementations, the electronic program guide may be configured to communicate with a resource distribution device, identify a list of multiple video program assets from the resource distribution device that are available for viewing by multiple subscribers, and identify a subset of multiple video program assets from the list of multiple video program assets that are currently being viewed by the subscribers. The electronic program guide may be configured to organize the list of multiple video program assets such that the subset of multiple video program assets is emphasized (or at least accentuated or highlighted in some manner) in the electronic program guide.

Various implementations of providing an electronic program guide or similar user interface will now be described in detail herein with reference to FIGS. 1-4.

Figure 1:
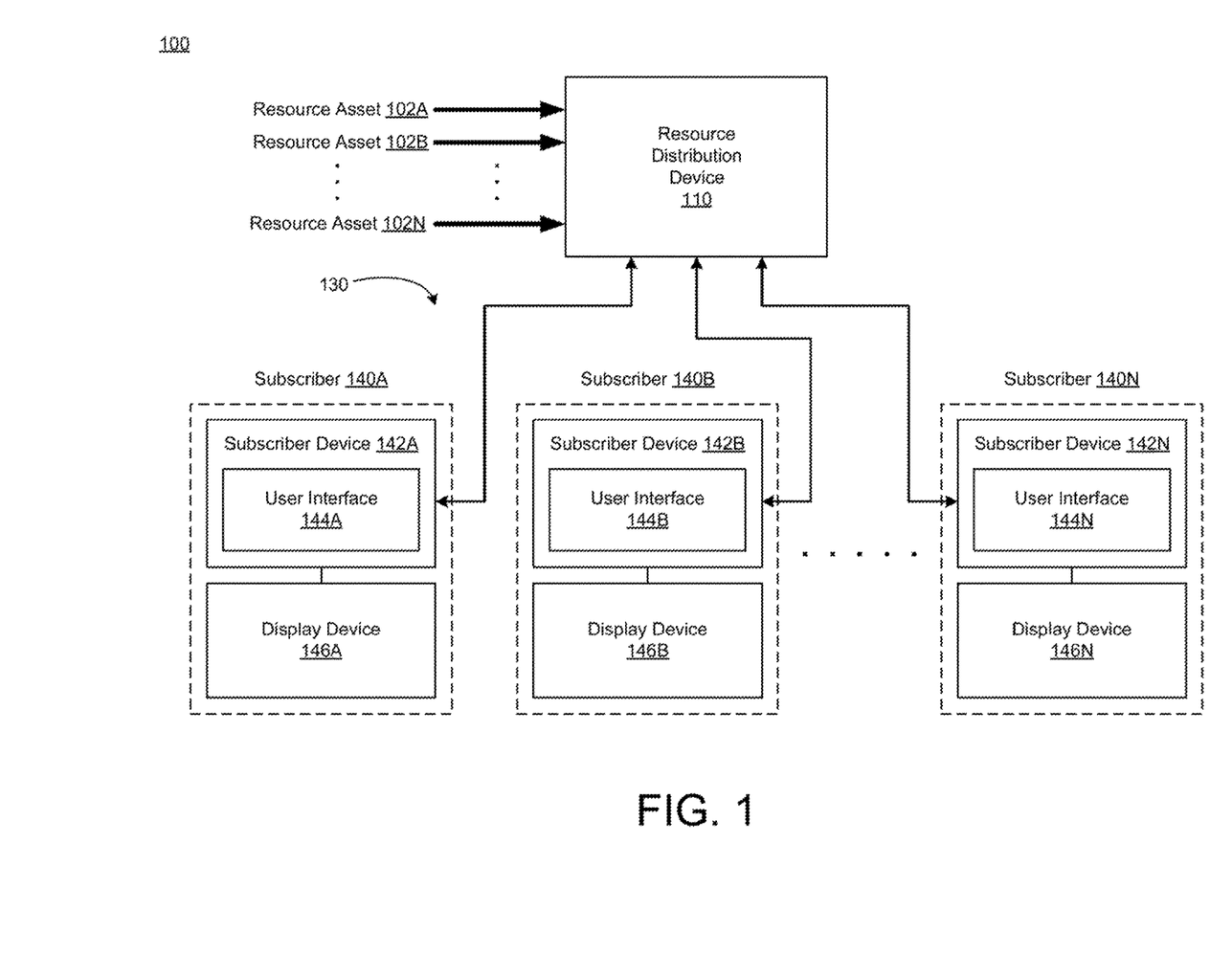
FIG. 1 illustrates a diagram of a resource distribution system in accordance with various implementations described herein.

FIG. 1 illustrates an example block diagram of a resource distribution system 100 in accordance with various implementations described herein.

The resource distribution system 100 may include a resource distribution device 110 that is capable of receiving and distributing multiple resource assets 102A, 102B, . . . , 102N from multiple different sources to subscribers 140A, 140B, . . . , 140N. The multiple resource assets may include video program assets that are associate with various genres of media, such as, e.g., movies, television, sports programs, etc.

The resource distribution system 100 may include a network 130 of digital video devices, such as, e.g., subscriber devices 142A, 142B, . . . , 142N. As shown in FIG. 1, each of the subscriber devices 142A, 142B, . . . , 142N may include a display device 146A, 146B, . . . , 146N and an electronic program guide or user interface 144A, 144B, . . . , 144N that is capable of interfacing with corresponding subscribers 140A, 140B, . . . , 140N via interaction with the display 146A, 146B, . . . , 146N. Each of the electronic program guides 144A, 144B, . . . , 144N may display resource data and information to the subscribers 140A, 140B, . . . , 140N via their corresponding display devices 146A, 146B, . . . , 146N. For instance, each of the electronic program guides 144A, 144B, . . . , 144N may display the list of assets 102A, 102B, . . . , 102N, display the subset of assets 102A, 102B, . . . , 102N, and display the organized list of assets 102A, 102B, . . . , 102N.

In some implementations, each of the electronic program guides 144A, 144B, . . . , 144N (or user interfaces) in the network 130 may be configured to communicate with the resource distribution device 110. Each of the electronic program guides 144A, 144B, . . . , 144N may be further configured to identify a list of the multiple video program assets 102A, 102B, . . . , 102N from the resource distribution device 110 that are available for viewing by the subscribers 140A, 140B, . . . , 140N. Each of the electronic program guides 144A, 144B, . . . , 144N may be further configured to identify a subset of the multiple video program assets 102A, 102B, . . . , 102N from the list of multiple video program assets 102A, 102B, . . . , 102N that are currently being viewed by the subscribers 140A, 140B, . . . , 140N. Further, each of the electronic program guides 144A, 144B, . . . , 144N may be further configured to organize the list of multiple video program assets 102A, 102B, . . . , 102N such that the subset of multiple video program assets 102A, 102B, . . . , 102N is emphasized in the electronic program guides 144A, 144B, . . . , 144N. These and various other related features associated with the list and subset of the list is described in greater detail herein in reference to FIGS. 2A-2D.

In some implementations, the system 100 may include (or be referred to as) a limited bandwidth digital video distribution system, and availability of each asset in the list of multiple video program assets 102A, 102B, . . . , 102N may be based on available bandwidth determined by the resource distribution device 110 at a time of requesting access to the asset by the subscribers 140A, 140B, . . . , 140N. Further, the list of multiple video program assets 102A, 102B, . . . , 102N may provide a number of total assets with a number of available assets that is at least less than the number of total assets. In some cases, the number of available assets may include a number of guaranteed assets that is being currently viewed, and the number of available assets may also include a number of non-guaranteed assets that is not currently being viewed.

In some implementations, SDV and OTT systems may be implemented with an application running on the resource distribution device (or server) 110 within the system 100, and a client application (e.g., electronic program guide or user interface 144A, 144B, . . . , 144N) executing on the subscriber device 142A, 142B, . . . , 142N (e.g., a set top box or television) within the subscriber's premises. This client application may be aware of whether the SDV session (or OTT multicast session) is already established (e.g., at least one viewer or subscriber is already watching one or more programs), or whether attempts should be made so as to establish an SDV or OTT session (e.g., this viewer or subscriber may be a first viewer to attempt to watch one or more programs). This information may be used to provide feedback to a viewer or subscriber in reference to programs that are guaranteed to be available, as opposed to programs that are not available. By knowing this, the viewer or subscriber may be less likely to be unpleasantly surprised if a program they attempted to view is not available. As such, they may realize that there is a possibility that some programs may not be available, thereby giving the viewer or subscriber a better user experience using the electronic program guide 144A, 144B, . . . , 144N.

FIGS. 2A-2D illustrate various diagrams of displaying an electronic program guide 200 in accordance with various implementations described herein.

As described herein, the electronic program guide 200 is configured to interface with viewers or subscribers via interaction with a display of a computing device, such as, e.g., a digital video device or other type of subscriber device. In some implementations, the electronic program guide 200 may identify a list of multiple video program assets from the resource distribution device that are available for viewing by the subscribers and also identify a subset of multiple video program assets from the list of multiple video program assets that are currently being viewed by the subscribers. Further, the electronic program guide 200 may organize the list of multiple video program assets such that the subset of multiple video program assets is emphasized in the electronic program guide.

Figure 2A:
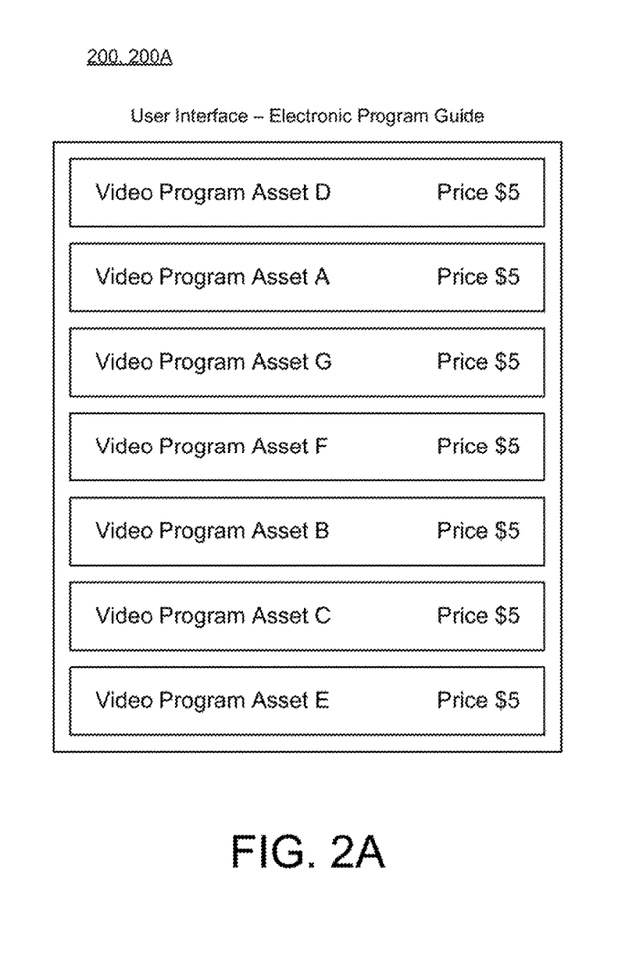
FIGS. 2A-2D illustrate various diagrams of displaying an electronic program guide in accordance with various implementations described herein.

FIG. 2A illustrates a diagram 200A of displaying data and information with the electronic program guide 200. In particular, FIG. 2A illustrates an example diagram of using the electronic program guide 200 to identify a list of assets (e.g., assets A-G) in the resource distribution system that are available for viewing by subscribers. As shown, the list of assets (e.g., assets A-G) may be displayed to subscribers via the electronic program guide. The list of assets (e.g., assets A-G) may include a number of total assets (e.g., 7 total assets). In some instances, FIG. 2A shows an initial condition, where it may be possible that none of the assets have been selected for viewing by subscribers.

Figure 2B:
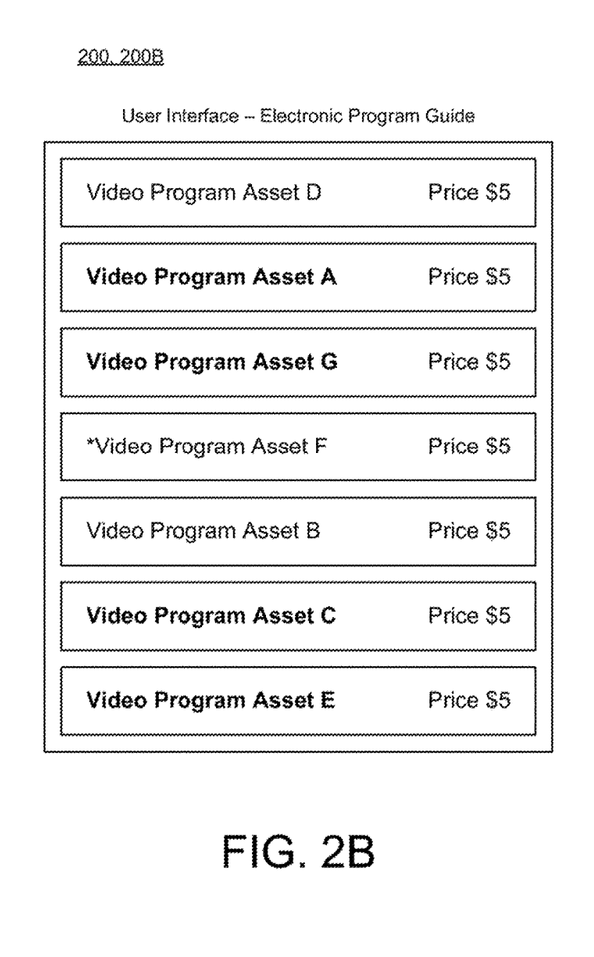

FIG. 2B illustrates a diagram 200B of displaying data and information with the electronic program guide 200. In particular, FIG. 2B illustrates an example diagram of using the electronic program guide 200 to identify a subset of assets (e.g., assets A, C, E, F, G) from the list of assets that are currently being viewed by subscribers. As shown, the subset of assets (e.g., assets A, C, E, F, G) may be displayed to subscribers via the electronic program guide. As shown, the organized list of assets (e.g., assets A-G) may be displayed to subscribers with the subset of assets (e.g., assets A, C, E, F, G) being emphasized with accentuations (e.g., bolded, highlight, etc.) via the electronic program guide.

Various other types of emphasis or accentuations may include changing the text attributes (e.g., font, color, style, etc.), changing color or shading of the box surrounding the text, addition of various icons, specialized characters, and/or images.

In some cases, the number of total assets (e.g., 7 total assets) may include a number of available assets (e.g., 5 available assets) that is at least less than the number of total assets (e.g., 7 total assets). The number of available assets (e.g., 5 available assets) may include a number of guaranteed assets (e.g., assets A, C, E, G) that is being currently viewed, and in some situations, the number of available assets (e.g., 5 available assets) may include a number of non-guaranteed assets (e.g., asset F, as indicated with an asterisk) that is not currently being viewed. In some situations, each of the assets in the emphasized subset of assets is being viewed by at least one subscriber; however, if all subscribers drop from viewing a particular asset (e.g., asset F), then some emphasis or some type of accentuation (e.g., an asterisk) may be used to provide an indication to subscribers that no subscriber is currently viewing that particular asset. The guaranteed assets may refer to a guaranteed status of a particular asset, and the non-guaranteed assets may refer to a non-guaranteed status of a particular asset.

Figure 2C:
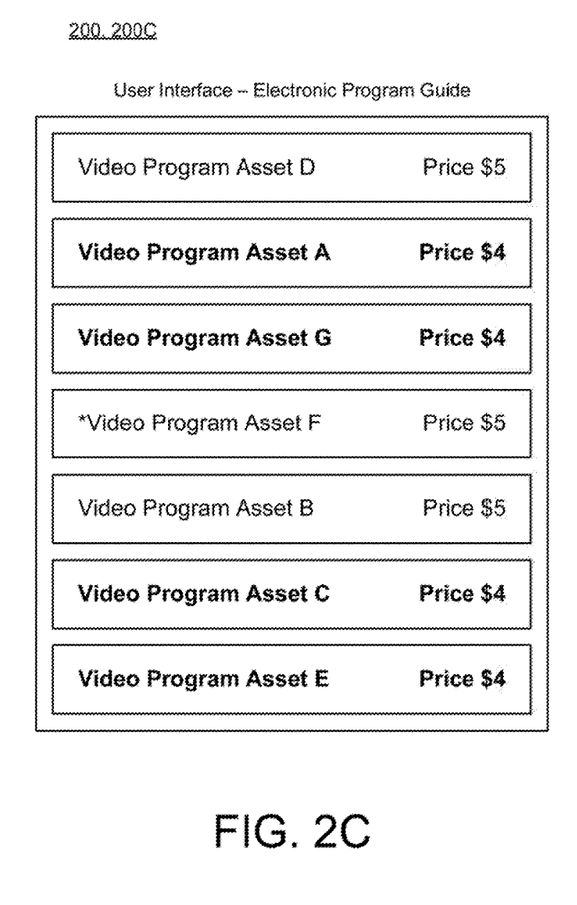

FIG. 2C illustrates a diagram 200C of displaying data and information with the electronic program guide 200. In particular, FIG. 2C illustrates an example diagram of using the electronic program guide 200 to identify the subset of assets (e.g., assets A, C, E, G) with accentuation, such as, e.g., bolded, highlight, etc. As shown, the subset of assets (e.g., assets A, C, E, G) may be displayed to subscribers with emphasized accentuations via the electronic program guide. In some cases, each asset in the list of assets (e.g., assets A-G) may have a purchase price (e.g., $5), and further, each asset in the emphasized subset of assets (e.g., assets A, C, E, G) may have a different reduced purchase price (e.g., $4) to encourage selection by subscribers, or at least provide some incentive for subscribers to select particular assets for viewing. In some situations, the purchase price of some assets (e.g., assets A, C, E, G) that are already being viewed by at least one subscriber may be reduced, so as to incentivize subscribers to select one of those assets (e.g., assets A, C, E, G), and thus discourage subscribers from selecting, e.g., asset F, which is not being viewed. Further, purchase prices may be adjusted dynamically based on viewership statistics.

Figure 2D:
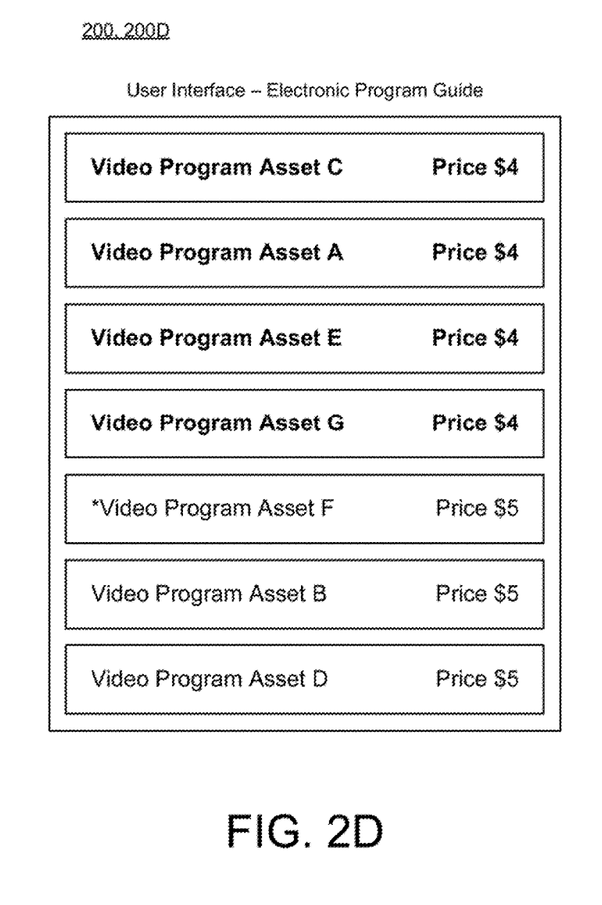

FIG. 2D illustrates a diagram 200D of displaying data and information with the electronic program guide 200. In particular, FIG. 2D illustrates an example diagram of using the electronic program guide 200 to organize (or sort, prioritize, etc.) the list of assets (e.g., assets A-G) such that the subset of assets (e.g., assets A, C, E, G) may be emphasized (e.g., accentuated and ordered by viewership) in the electronic program guide 200. As shown, the organized list of assets (e.g., assets A-G) may be displayed to subscribers with the subset of assets (e.g., assets A, C, E, G) emphasized with an accentuation via the electronic program guide. In some cases, the emphasized subset of assets (e.g., assets A, C, E, G) may be moved (or re-organized, re-sorted, etc.) to a top of the list of assets to encourage selection by the subscribers. In some other cases, the emphasized subset of (e.g., assets A, C, E, G) may be sequentially ordered from top to bottom based on a number of subscribers that are currently viewing each asset to encourage selection by the subscribers. For instance, asset C may have the highest number of subscribers currently viewing, followed by asset A with the next highest viewership, and so on down the list. Encouraging subscribers to purchase assets refers to providing some sort of incentive (e.g., a reduced purchase price) for subscribers to select one or more particular assets for viewing. For instance, this incentive may refer to encouraging subscribers to select a guaranteed asset over a non-guaranteed asset, so as to improve the subscribers viewing experience. Thus, one way to increase likelihood of selecting a guaranteed asset may be to order the list of the available assets with those having guaranteed availability listed first, e.g., as shown in FIG. 2D.

In some implementations, availability of one or more assets in the list of assets (e.g., assets A-G) is based on available bandwidth in the resource distribution system at a time of requesting access to the asset by subscribers. In some situations, each asset in the emphasized subset of assets may be a guaranteed asset for selection of viewing by subscribers. However, in other situations, each asset not in the emphasized subset of assets may be a non-guaranteed asset for selection of viewing by subscribers. Further, the list of assets may provide a number of total assets with a number of available assets that is at least less than the number of total assets. In this instance, the available assets may include a number of guaranteed assets that is being currently viewed and, in some instances, a number of non-guaranteed assets that is not currently being viewed.

By providing subscriber feedback to indicate if a program is guaranteed or not guaranteed, the subscriber's experience may be enhanced. Using dynamic ordering and dynamic pricing may encourage subscribers to select or choose guaranteed programs, thereby avoiding situations of disappointment if the subscriber's programming selection or choice is not available. Further, subscriber feedback and dynamic listing/pricing may be combined in the electronic program guide (EPG) to provide the data and information, as well as encourage a selection from the guaranteed list. This may allow the resource distribution service to offer a substantial list of possible programs to view, while allowing the subscriber to understand the nature of the limited availability, thereby avoiding an unpleasant surprise when a program is unavailable. This may be especially useful if there are many more offerings than are possible to be simultaneously delivered. For instance, if there were 300 programs offered, and capacity for only 80 to be selected, the subscriber may rely on the EPG indications to establish a sense of what they may definitely watch, as opposed to what they may be able to watch. Furthermore, SDV sessions may be used as the pretext for which the dynamic ordering is applied; however, the implementations may also be applied to OTT video distribution systems using multicast.

Figure 3:
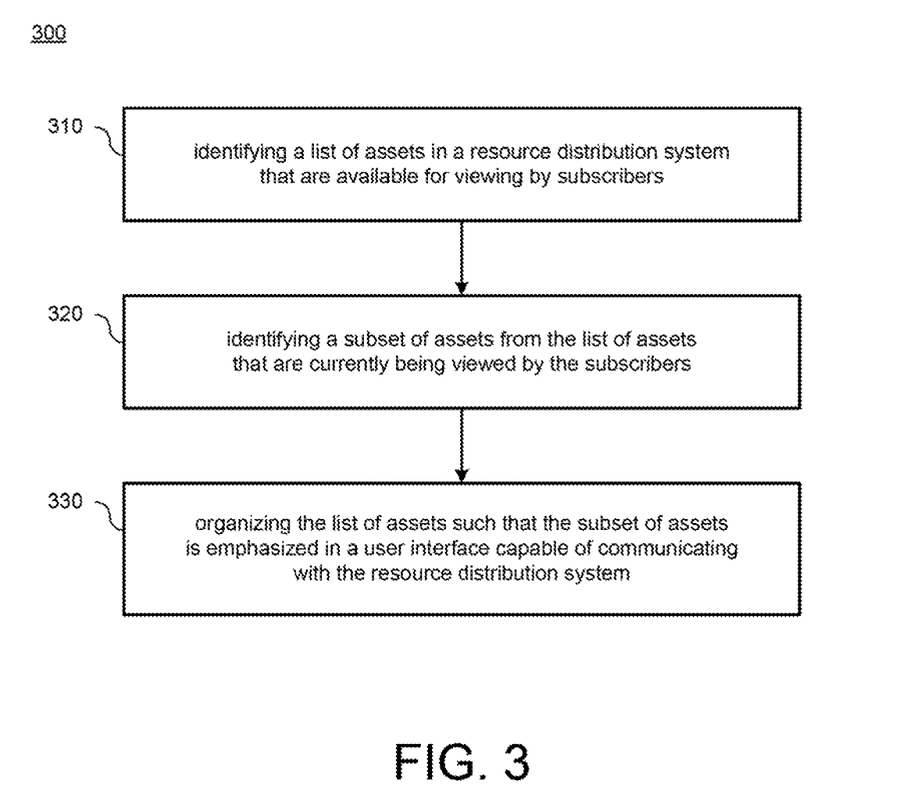
FIG. 3 illustrates a process of a method for displaying an electronic program guide in accordance with various implementations described herein.

FIG. 3 illustrates a process flow of a method 300 for displaying an electronic program guide in accordance with various implementations described herein.

It should be understood that even though method 300 may indicate a particular order of operation execution, in some instances, various certain portions of the operations may be executed in a different order, and on different systems. In some other instances, additional operations or steps may be added to and/or omitted from method 300. Further, the method 300 may be implemented in hardware and/or software. If implemented in hardware, the method 300 may be implemented with various circuit components, such as described herein in reference to FIGS. 1-3. If implemented in software, the method 300 may be implemented as a program or software instruction process that may be configured to provide for displaying an electronic program guide. Further, if implemented in software, instructions related to implementing the method 300 may be stored in memory and/or a database. In some instances, a computer or various other computing devices having a processor and memory may be configured to perform method 300.

In reference to FIG. 3, method 300 may provide for displaying an electronic program guide. For instance, at block 310, method 300 may identify a list of assets in a resource distribution system that are available for viewing by subscribers. The resource distribution system may include a video distribution network relying on multicasting of real time video streams. Each asset in the list of assets may include a switched digital video (SDV) program session or an over-the-top (OTT) multicast program session that is started for each asset selected for viewing by the subscribers.

The list of assets may include a number of total assets, and the number of total assets may include a number of available assets that is at least less than the number of total assets. The number of available assets may include a number of guaranteed assets that is being currently viewed, and the number of available assets may include a number of non-guaranteed assets that is not currently being viewed. Availability of an asset in the list of assets may be based on available bandwidth in the resource distribution system at a time of requesting access to the asset by the subscribers.

At block 320, method 300 may identify a subset of assets from the list of assets that are currently being viewed by the subscribers, and at block 330, method 300 may organizing the list of assets such that the subset of assets is emphasized in an electronic program guide (or some other type of user interface) capable of communicating with the resource distribution system. Each asset in the emphasized subset of assets is currently being viewed by at least one subscriber. Each asset in the emphasized subset of assets is a guaranteed asset for selection of viewing by the subscribers, and each asset not in the emphasized subset of assets is a non-guaranteed asset for selection of viewing by the subscribers. The emphasized subset of assets may be moved to a top of the list of assets to encourage selection by the subscribers. The emphasized subset of assets may be sequentially ordered from top to bottom based on a number of subscribers that are currently viewing each asset to encourage selection by the subscribers. Each asset in the list of assets has a purchase price, and each asset in the emphasized subset of assets has a reduced purchase price to encourage selection by the subscribers.

In some implementations, method 300 may further include displaying the list of assets to the subscribers via the user interface, displaying the subset of assets to the subscribers via the user interface, and displaying the organized list of assets via the user interface such that the subset of assets is emphasized in the user interface. Further, the method 300 may be performed by a computing device, such as a digital video device, and the electronic program guide may include a user interface capable of interfacing with each of the subscribers via, e.g., a display of the digital video device.

Figure 4:
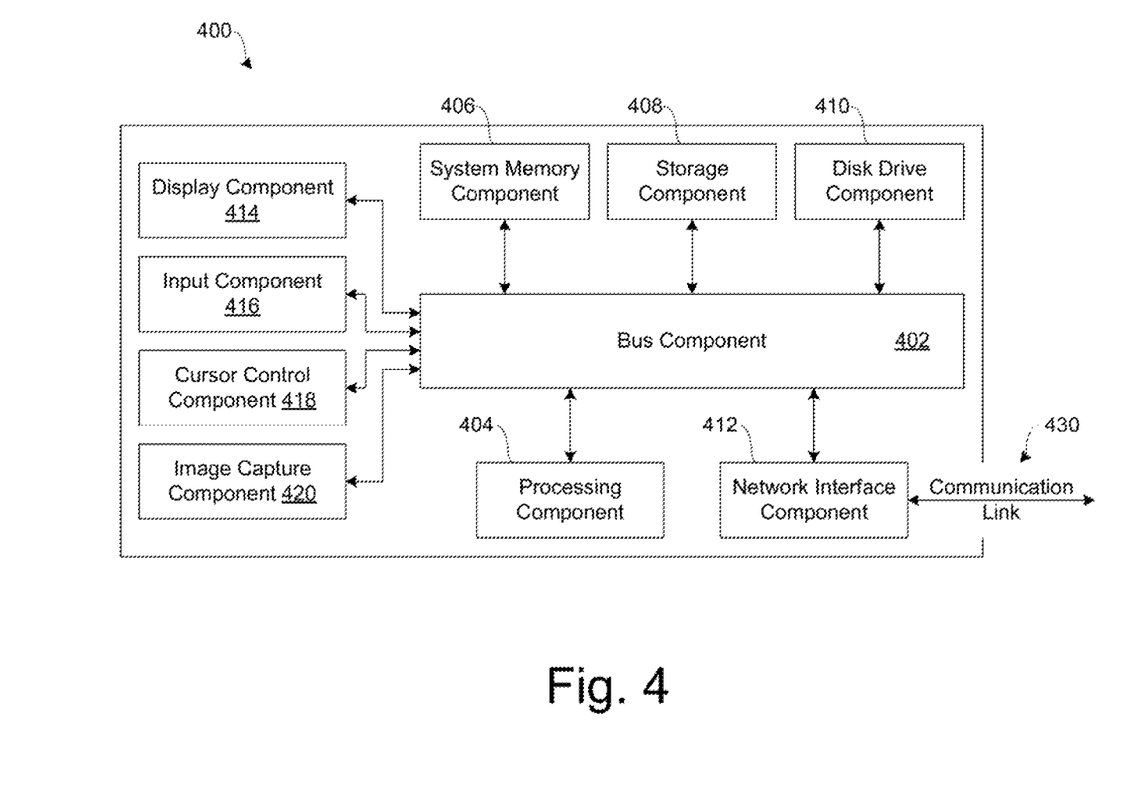
FIG. 4 illustrates a block diagram of a computing device in accordance with various implementations described herein.

FIG. 4 is a block diagram of a computing device 400 suitable for implementing various embodiments of the present disclosure, including components of the subscriber 140, such as, e.g., subscriber devices 142A, 142B, . . . , 142N. In various implementations, the subscriber 140 may be embodied as various types of network communication devices, such as, e.g., set-top box, cable box, smart television, personal computer, mobile cellular phone, laptop, etc.) capable of communicating over a wired and/or wireless network with various other network computing devices, such as, e.g., the resource distribution device 110, which may be embodied as a network server. Therefore, it should be appreciated that each of the subscriber devices 142A, 142B, . . . , 142N may be implemented as the computing device 400 for network communication in a manner as follows.

In accordance with various embodiments of the present disclosure, computer system 400, such as a digital video device, a mobile communication device, or similar, includes a bus 402 or other communication mechanism for communicating information, which interconnects subsystems and components, such as processing component 404 (e.g., processor, micro-controller, digital signal processor (DSP), etc.), system memory component 406 (e.g., RAM), static storage component 408 (e.g., ROM), disk drive component 410 (e.g., magnetic or optical), network interface component 412 (e.g., modem or Ethernet card), display component 414 (e.g., CRT or LCD), input component 416 (e.g., keyboard), cursor control component 418 (e.g., mouse or trackball), and image capture component 420 (e.g., analog or digital camera). In one implementation, disk drive component 410 may comprise a database having one or more disk drive components.

In accordance with various embodiments of the present disclosure, the computer system 400 performs specific operations by processor 404 executing one or more sequences of one or more instructions contained in system memory component 406. Such instructions may be read into system memory component 406 from another computer readable medium, such as static storage component 408 or disk drive component 410. In other embodiments, hard-wired circuitry may be used in place of or in combination with software instructions to implement the present disclosure.

Logic may be encoded in a computer readable medium, which may refer to any medium that participates in providing instructions to processor 404 for execution. Such a medium may take many forms, including but not limited to, non-volatile media and volatile media. In various implementations, non-volatile media includes optical or magnetic disks, such as disk drive component 410, and volatile media includes dynamic memory, such as system memory component 406. In some implementations, data and information related to execution instructions may be transmitted to computer system 400 via a transmission media, such as in the form of acoustic or light waves, including those generated during radio wave and infrared data communications. In various implementations, transmission media may include coaxial cables, copper wire, and/or fiber optics, including wires that comprise bus 402.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 430 (e.g., a LAN, WLAN, PTSN, and/or various other wired or wireless networks, including telecommunications, mobile, and cellular phone networks) may perform instruction sequences to practice implementations of the present disclosure in coordination with one another.

In various embodiments of the present disclosure, computer system 400 may transmit and receive messages, data, information and instructions, including one or more programs (i.e., application code) through communication link 430 and communication interface 412. Further, received program code may be executed by the processor 404 as received and/or stored in disk drive component 410 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

It should be intended that the subject matter of the claims not be limited to the implementations and illustrations provided herein, but include modified forms of those implementations including portions of implementations and combinations of elements of different implementations in accordance with the claims. It should be appreciated that in the development of any such implementation, as in any engineering or design project, numerous implementation-specific decisions should be made to achieve developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Reference has been made in detail to various implementations, examples of which are illustrated in the accompanying drawings and figures. In the following detailed description, numerous specific details are set forth to provide a thorough understanding of the disclosure provided herein. However, the disclosure provided herein may be practiced without these specific details. In some other instances, well-known methods, procedures, components, circuits and networks have not been described in detail so as not to unnecessarily obscure details of the embodiments.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised in accordance with the disclosure herein, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
   in a resource distribution system comprising a limited bandwidth digital video distribution system, identifying a plurality of assets that are available at a current time via the resource distribution system for viewing by subscribers on a plurality of subscriber devices communicatively coupled to the limited bandwidth digital video distribution system;
   providing a list of assets that lists a number of available assets that is lower than a total number of all assets in the plurality of assets,
      wherein the number of available assets includes one or more guaranteed assets each of which is already being delivered at the current time to one or more of the subscriber devices, and
      wherein the number of available assets includes one or more non-guaranteed assets each of which is not being delivered at the current time to any of the subscriber devices;
   identifying, for a subscriber device, a subset of assets listed in the list of assets, the subset of assets corresponding to the guaranteed assets each of which is being delivered to another one or more of the subscriber devices at the current time, based at least on determining whether, at the current time, one or more of the available assets is already being delivered to the other one or more of the subscriber devices via an already-established Switched-Digital-Video SDV session or an already-established over-the-top multicast session;
   organizing the list of assets such that the subset of assets is emphasized in a user interface of the subscriber device, the user interface capable of communicating with the resource distribution system; and
   displaying the organized list of assets, via the user interface, for viewing by a subscriber associated with the subscriber device.

2. The method of claim 1, further comprising:
   displaying the list of assets to a subscriber via the user interface;
   displaying the subset of assets to a subscriber via the user interface; and
   displaying the organized list of assets via the user interface such that the subset of assets is emphasized in the user interface.

3. The method of claim 1, wherein the resource distribution system comprises a video distribution network relying on multicasting of real time video streams.

4. The method of claim 1, wherein each asset in the list of assets is a switched digital video (SDV) program session or an over-the-top (OTT) multicast program session that can be started for each asset selected for viewing by the subscribers.

5. The method of claim 1, wherein the current time is determined based at least on a time of a request for the list of assets available for viewing by the subscriber.

6. The method of claim 1, wherein availability of an asset in the list of assets is determined based at least on available bandwidth in the limited bandwidth digital video distribution system at the current time.

7. The method of claim 1, wherein each asset in the emphasized subset of assets is guaranteed to be available for viewing by the subscriber.

8. The method of claim 7, wherein each asset not in the emphasized subset of assets is not guaranteed to be available for viewing by the subscriber.

9. The method of claim 1, wherein each asset in the emphasized subset of assets is being viewed by at least one subscriber at the current time.

10. The method of claim 1, wherein the emphasized subset of assets are moved to a top of the list of assets to encourage selection by the subscriber.

11. The method of claim 1, wherein the emphasized subset of assets are sequentially ordered from top to bottom based on a number of subscribers that are viewing each asset at the current time, to encourage selection by the subscriber.

12. The method of claim 1, wherein each asset in the list of assets has a purchase price, and wherein each asset in the emphasized subset of assets has a reduced purchase price to encourage selection by the subscriber.

13. A device comprising:
   a processor communicatively coupled to a resource distribution system comprising a limited bandwidth digital video distribution system; and
   memory having stored thereon instructions that, when executed by the processor, cause the processor to:
   identify a plurality of assets that are available at a current time via the resource distribution system for viewing by subscribers on a plurality of subscriber devices communicatively coupled to the limited bandwidth digital video distribution system;
   provide a list of assets that lists a number of available assets that is lower than a total number of all assets in the plurality of assets, wherein the number of available assets includes one or more guaranteed assets each of which is already being delivered at the current time to one or more of the subscriber devices, and wherein the number of available assets includes one or more non-guaranteed assets each of which is not being delivered at the current time to any of the subscriber devices;

identify, for a subscriber device, a subset of assets listed in the list of assets, the subset of assets corresponding to the guaranteed assets each of which is being delivered to another one or more of the subscriber devices at the current time, based at least on determining whether, at the current time, one or more of the available assets is already being delivered to the other one or more of the subscriber devices via an already-established Switched-Digital-Video SDV session or an already-established over-the-top multicast session;

organize the list of assets such that the subset of assets is emphasized in a user interface of the subscriber device, the user interface capable of communicating with the resource distribution system; and display the organized list of assets, via the user interface, for viewing by a subscriber associated with the subscriber device.

14. The device of claim 13, wherein the device comprises a digital video device, and wherein the user interface comprises an electronic program guide capable of interfacing with each of the subscribers via a display of the digital video device.

15. The device of claim 14, wherein the electronic program guide displays the list of assets to the subscribers, displays the subset of assets to the subscribers, and displays the organized list of assets to the subscribers.

16. The device of claim 13, wherein availability of an asset in the list of assets is determined based at least on available bandwidth in the limited bandwidth digital video distribution system at the current time, and wherein the current time is determined based at least on a time of a request for the list of assets available for viewing by the subscriber.

17. A non-transitory computer-readable medium having stored thereon a plurality of computer-executable instructions which, when executed by a computer, cause the computer to:

communicate with a resource distribution device comprising a limited bandwidth digital video distribution device that receives and distributes multiple video program assets from multiple different sources to subscribers;

identify a plurality of multiple video program assets that are available at a current time from the resource distribution device for viewing by the subscribers on a plurality of subscriber devices communicatively coupled to the limited bandwidth digital video distribution device;

provide a list of assets that lists a number of available assets that is lower than a total number of all assets in the plurality of assets, wherein the number of available assets includes one or more guaranteed assets each of which is already being delivered at the current time to one or more of the subscriber devices, and wherein the number of available assets includes one or more non-guaranteed assets each of which is not being delivered at the current time to any of the subscriber devices;

identify, for a subscriber device, a subset of multiple video program assets listed in the list of multiple video program assets, the subset of multiple video program assets corresponding to the guaranteed assets each of which is being delivered to another one or more of the subscriber devices at the current time, based at least on determining whether, at the current time, one or more of the available assets is already being delivered to the other one or more of the subscriber devices via an already-established Switched-Digital-Video SDV session or an already-established over-the-top multicast session;

organize the list of multiple video program assets such that the subset of multiple video program assets is emphasized in an electronic program guide that interfaces with the subscribers via interaction with a display device; and display the organized list of multiple video program assets, via the display device, for viewing by a subscriber associated with the subscriber device.

18. The computer-readable medium of claim 17, wherein the resource distribution device comprises a limited bandwidth digital video distribution device, and wherein availability of an asset in the list of multiple video program assets is determined based at least on available bandwidth in the limited bandwidth digital video distribution device at the current time.

19. The computer-readable medium of claim 17, wherein currently time is determined based at least on a time of a request for the list of assets available for viewing by the subscriber.

* * * * *